US012757179B2

(12) United States Patent
Wang

(10) Patent No.: US 12,757,179 B2

(45) Date of Patent: Oct. 6, 2026

(54) SYSTEM AND METHOD FOR RESOURCE ALLOCATION USING BANDWIDTH PARTS

(71) Applicant: T-Mobile Innovations LLC, Overland Park, KS (US)

(72) Inventor: Jun Wang, Sammamish, WA (US)

(73) Assignee: T-Mobile Innovations LLC, Overland Park, KS (US)

(*) Notice: Subject to any disclaimer, the term of this patent is extended or adjusted under 35 U.S.C. 154(b) by 492 days.

(21) Appl. No.: 18/175,708

(22) Filed: Feb. 28, 2023

(65) Prior Publication Data

US 2024/0292397 A1 Aug. 29, 2024

(51) Int. Cl.

*H04W 72/0453* (2023.01)
*H04W 72/0457* (2023.01)
*H04W 72/23* (2023.01)
*H04W 72/54* (2023.01)

(52) U.S. Cl.

CPC ....... *H04W 72/0457* (2023.01); *H04W 72/23* (2023.01); *H04W 72/54* (2023.01)

(58) Field of Classification Search

CPC ............. H04W 72/0457; H04W 72/23; H04W 72/0453; H04W 72/54; H04L 5/0098
USPC .......................................................... 370/329
See application file for complete search history.

(56) References Cited

U.S. PATENT DOCUMENTS 11,601,252 B2 * 3/2023 Hui ........................ H04W 76/27
11,799,616 B2 * 10/2023 Zhou ..................... H04W 72/23
11,962,399 B2 * 4/2024 Ang ....................... H04L 5/0007
12,273,924 B2 * 4/2025 Cirik ................. H04W 74/0833
2023/0074086 A1 * 3/2023 Yi .......................... H04L 1/1822
2024/0015657 A1 * 1/2024 Chen ................. H04L 27/26025
2024/0373413 A1 * 11/2024 Hill ................... H04W 72/0457

OTHER PUBLICATIONS

Shah, Samarth H., Kai Chen, and Klara Nahrstedt. "Dynamic bandwidth management in single-hop ad hoc wireless networks." Mobile Networks and Applications: 199-217. (Year: 2005).*

Lin et al., "A primer on bandwidth parts in 5g new radio." 5G and Beyond: Fundamentals and Standards. pp. 357-370 (2021).

* cited by examiner

*Primary Examiner* — Christopher M Crutchfield
*Assistant Examiner* — Syed Ahmed
(74) *Attorney, Agent, or Firm* — Jones Burke, PLLC

(57) ABSTRACT

Systems, methods, and processing nodes for managing network resources perform and/or comprise: configuring a first bandwidth part (BWP) and a second BWP for a wireless device, wherein the wireless device is configured to communicate with an access node over the first BWP, wherein the first BWP has a first resource allocation type and the second BWP has a second resource allocation type; setting a traffic condition; monitoring a traffic parameter for communications between the wireless device and the access node; and in response to a determination that the traffic parameter meets the traffic condition, instructing the wireless device to switch from communication with the access node over the first BWP to communication with the access node over the second BWP.

20 Claims, 5 Drawing Sheets

SYSTEM AND METHOD FOR RESOURCE ALLOCATION USING BANDWIDTH PARTS

TECHNICAL BACKGROUND

Wireless telecommunications are generally provided via a plurality of geographically overlapping networks. From an infrastructure standpoint, a wireless device ("user equipment" or UE) may receive telecommunications services via an access node. For cellular telephone and data services, the individual networks may implement a plurality of radio access technologies (RATs) simultaneously using one or a plurality of access nodes. RATs can include, for example, 3G RATs such as Global System for Mobile Communications (GSM), Universal Mobile Telecommunications System (UMTS), Code-Division Multiple Access (CDMA), etc.; 4G RATs such as Worldwide Interoperability for Microwave Access (WiMAX), Long Term Evolution (LTE), etc.; and 5G RATs such as new radio (NR).

Various portions of the electromagnetic spectrum are allocated to wireless communications. For example, 5G NR communication utilizes frequencies below 6 GHz (Frequency Range 1) and above 24 GHz (Frequency Range 2), which are further divided into a plurality of bands which themselves may be further divided into component carriers (CCs). In NR communication, CCs may correspond to bandwidths of up to 100 megahertz (MHz) in Frequency Range 1 and up to 400 MHz in Frequency Range 2. NR CCs may also be aggregated together to provide increased bandwidth. Due to this wide bandwidth, NR introduces the concept of a bandwidth part (BWP), which is a group of contiguous of resource blocks (RBs). A BWP may have a bandwidth of less than or equal to a bandwidth of the CC in which it resides, and generally greater than or equal to the bandwidth required for one synchronization signal block (SSB). A given CC may include multiple BWPs. Different BWPs may be configured with different parameters and/or signal characteristics. A wireless device may be configured with up to four BWPs in the downlink (DL) and uplink (UL) directions, but only one BWP may be active at a given time.

Additionally, the 5G NR standard defines two types of downlink resource allocation types in the frequency domain, referred to as "Type 0" and "Type 1." In a Type 0 allocation scheme, the resource allocation granularity is at the Resource Block Group (RBG) level, in which a RBG is a number of consecutive virtual resource blocks (e.g., 2, 4, 8, or 16 RBs depending on the size of the BWP and/or configuration information). The resource block assignment information may a bitmap indicating the RBGs that are allocated to the scheduled UE and having a size of one bit per RBG so that each RBG is addressable. In a Type 1 allocation scheme, the resource allocation granularity is at the RB level, meaning that the network can allocate resources as small as a single RB up to several contiguous RBs. In this case, the resource block assignment information may include a starting RB identifier and a length identifier.

Overview

Various aspects of the present disclosure relate to systems and methods of managing network resources (e.g., by allocating resources using bandwidth parts) in a telecommunications network.

In one exemplary aspect of the present disclosure, a method of managing network resources comprises configuring a first bandwidth part (BWP) and a second BWP for a wireless device, wherein the wireless device is configured to communicate with an access node over the first BWP, wherein the first BWP has a first resource allocation type and the second BWP has a second resource allocation type; setting a traffic condition; monitoring a traffic parameter for communications between the wireless device and the access node; and in response to a determination that the traffic parameter meets the traffic condition, instructing the wireless device to switch from communication with the access node over the first BWP to communication with the access node over the second BWP.

In another exemplary aspect of the present disclosure, a system for managing network resources comprises an access node configured to communicate with a wireless device over a carrier, the access node including at least one electronic processor configured to perform operations including: transmitting a configuration message to the wireless device, the configuration message defining a first bandwidth part (BWP) having a first resource allocation type and a second BWP having a second resource allocation type different from the first resource allocation type; monitoring a traffic parameter for data communications from the access node to the wireless device; and in response to a determination that the traffic parameter meets a traffic condition, transmitting a first instruction to the wireless device, the instruction causing the wireless device to switch from using the first BWP to using the second BWP.

In yet another exemplary aspect of the present disclosure, a non-transitory computer-readable medium stores instructions that, when executed by an electronic processor of a processing node, cause the processing node to perform operations comprising defining a first dedicated bandwidth part (BWP) and a second BWP for communications from an access node to a wireless device, wherein the first BWP is associated with a first resource allocation type and the second BWP is associated with a second resource allocation type different from the first resource allocation type; configuring the wireless device with the first BWP and the second BWP; monitoring a traffic pattern for the communications from the access node to the wireless device using the first BWP; and in response to a determination that the traffic pattern indicates that an average packet size exceeds a first threshold, instructing the wireless device to switch to receiving the communications from the access node using the second BWP.

In this manner, these and other aspects of the present disclosure provide for improvements in at least the technical field of telecommunications, as well as the related technical fields of network management, device management, network security, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

Figure 1:
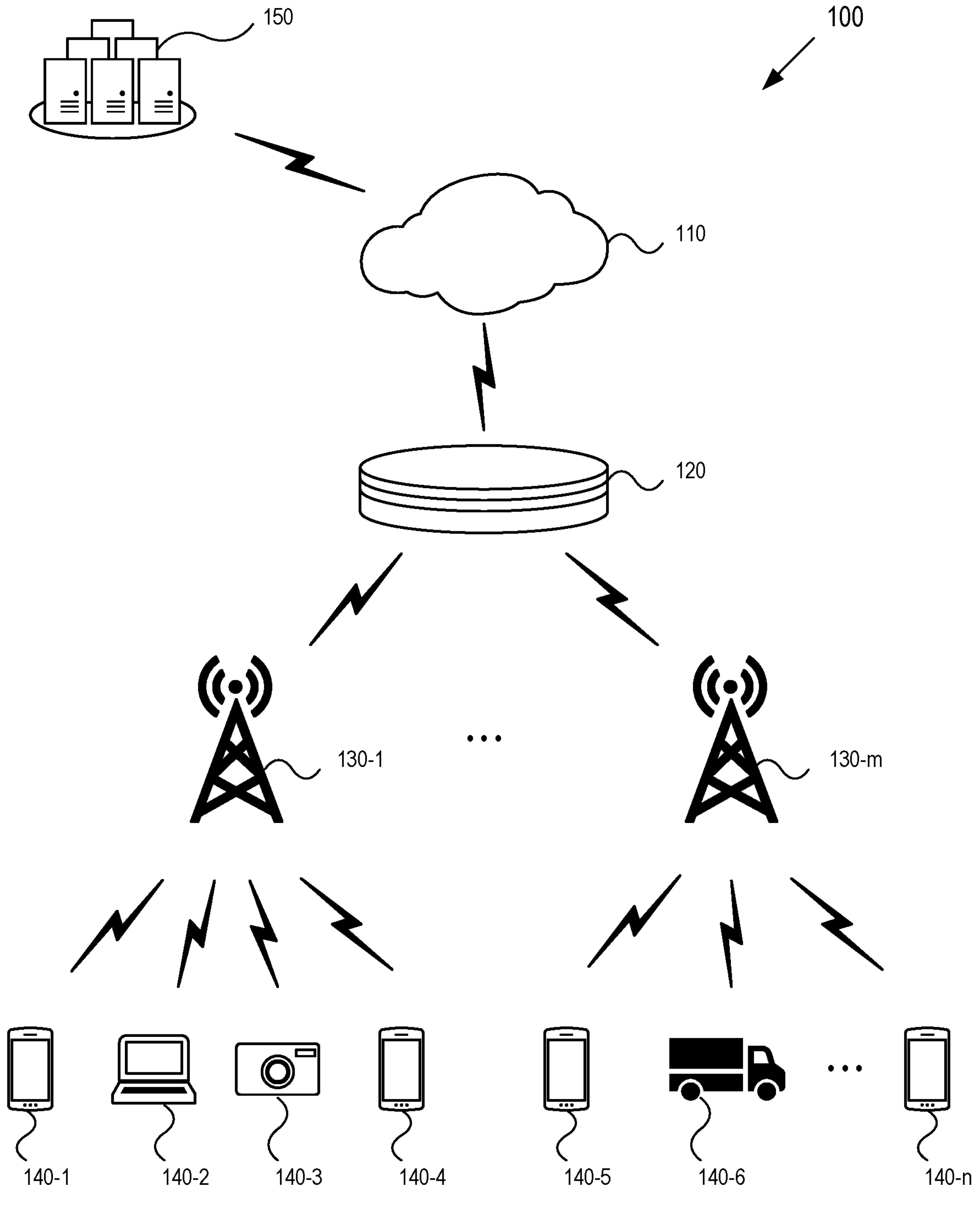
FIG. 1 illustrates an exemplary system for wireless communication in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processing node or nodes on the network for executing the instructions or methods. The processing node or nodes may include an electronic processor included in the access node and/or an electronic processor included in any controller node in the wireless network that is coupled to the access node.

As noted above, the 5G NR standard defines both Type 0 and Type 1 downlink resource allocation schemes, details of which are set forth in, for example, 3rd Generation Partnership Project (3GPP) Technical Specification (TS) 38.214, section 5.1.2.2. The Type 0 and Type 1 schemes have different granularities, in which the term "granularity" may refer to the smallest allocatable set of resource blocks. The Type 0 allocation scheme has a resource allocation granularity at the RBG level, such that the network can allocate resources as small as a single RBG (and thus several RBs). This scheme may be more efficient when the network is transmitting relatively large packets to a UE while taking advantage of frequency diversity. However, when Type 0 allocation is used to transmit relatively small packets, padding may be needed to fill up the entire RBG. This can lead to spectrum inefficiency and more interference in the network. The Type 1 allocation scheme has a resource allocation granularity at the RB level, such that the network can allocate resources as small as a single RB. This scheme may be more efficient when the network is transmitting relatively small packets to a UE, such as background keep-alive packets, voice packets, and the like. However, the Type 1 allocation may be less efficient when transmitting relatively large packets.

The 3GPP TS 38.214 describes two possible ways to switch between Type 0 allocation and Type 1 allocation: using a dynamic switch in Downlink Control Information (DCI), or using Radio Resource Control (RRC) Reconfiguration. However, the use of DCI is only possible if the UE supports dynamic switching between Type 0 allocation and Type 1 allocation and if the network is configured to take advantage of such UE capability. Because many types of UEs do not support dynamic switching between Type 0 allocation and Type 1 allocation, this type of switching is often unavailable. On the other hand, the use of RRC Reconfiguration is much slower (e.g., on the order of tens of milliseconds) and incurs high overhead because of the size of the RRC Reconfiguration message (often on the order of hundreds of bytes). Therefore, there exists a need for systems, devices, and methods for resource allocation which provide fast (e.g., several milliseconds) downlink resource allocation type switching with minimal overhead.

Accordingly, the present disclosure provides for systems, methods, and devices which implement downlink resource allocation type changes using BWP and BWP switching. Various aspects of the present disclosure provide for improved network resource usage and spectrum efficiency by dynamically and quickly adapting the resource allocation types to traffic patterns (e.g., instantaneous relative traffic of large vs. small sized packets). Thus, various aspects of the present disclosure improve NR UE and/or access node performance, provide improved utilization of resources (e.g., better spectral efficiency, and/or improved battery usage).

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as a smartphone, a tablet, a laptop computer, and so on. The term "wireless device" is used interchangeably with the term "wireless communication device" herein.

In accordance with various aspects of the present disclosure, a cellular or wireless network may be provided by an access node. While examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with an NR gNodeB. Additionally, for purposes of illustration and explanation, various portions of this detailed description refer to implementations in a network a 5G NR RAT; however, the present disclosure is not so limited. The systems and methods described herein may be implemented in a network using any RAT capable of supporting BWPs, including further extensions or updated implementations of 5G (e.g., 5G Advanced) or newer generations of RATs.

FIG. 1 illustrates an exemplary system 100 for use with various aspects of the present disclosure. As illustrated, the system 100 includes a cloud platform 110, a core network 120, and a plurality of access nodes 130-1 to **130-*m* (collectively referred to as access nodes 130), and a plurality of wireless devices 140-1 to 140-*n* (collectively referred to as wireless devices 140). Other computing systems and devices 150 may be connected to the cloud platform 110, for example to monitor and/or control the wireless devices 140. While FIG. 1 illustrates only two of the access nodes 130**, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network 120 via a wired connection.

The cloud platform 110, which may be an NR cloud platform, may perform processing and forward results to the computing systems and devices 150 and/or the wireless devices 140. The core network 120, which may be a 5G Core Network (5GCN), connects with the cloud platform 110 and the access nodes 130. Examples of the core network and/or the access nodes 130 will be described in more detail below with respect to FIGS. 2 and 3. Subsets of the access nodes 130 may be respectively configured to provide service in different areas, on different bands, for different RATs, and so on. FIG. 1 illustrates a situation in which the system 100 is operated by a single network operator. In many geographical areas, multiple access nodes 130 provide coverage that may overlap.

The wireless devices 140 are devices configured with appropriate technologies for connecting to the cloud platform 110. The wireless devices 140 may be or include mobile communication devices such as smartphones, laptop computers, tablet computers, and the like; vehicles such as cars, trucks, and the like; and/or Internet-of-Things (IoT) devices such as smart-home sensors, and the like. Examples of the wireless devices 140 will be described in more detail below with respect to FIGS. 2 and 4.

Figure 2:
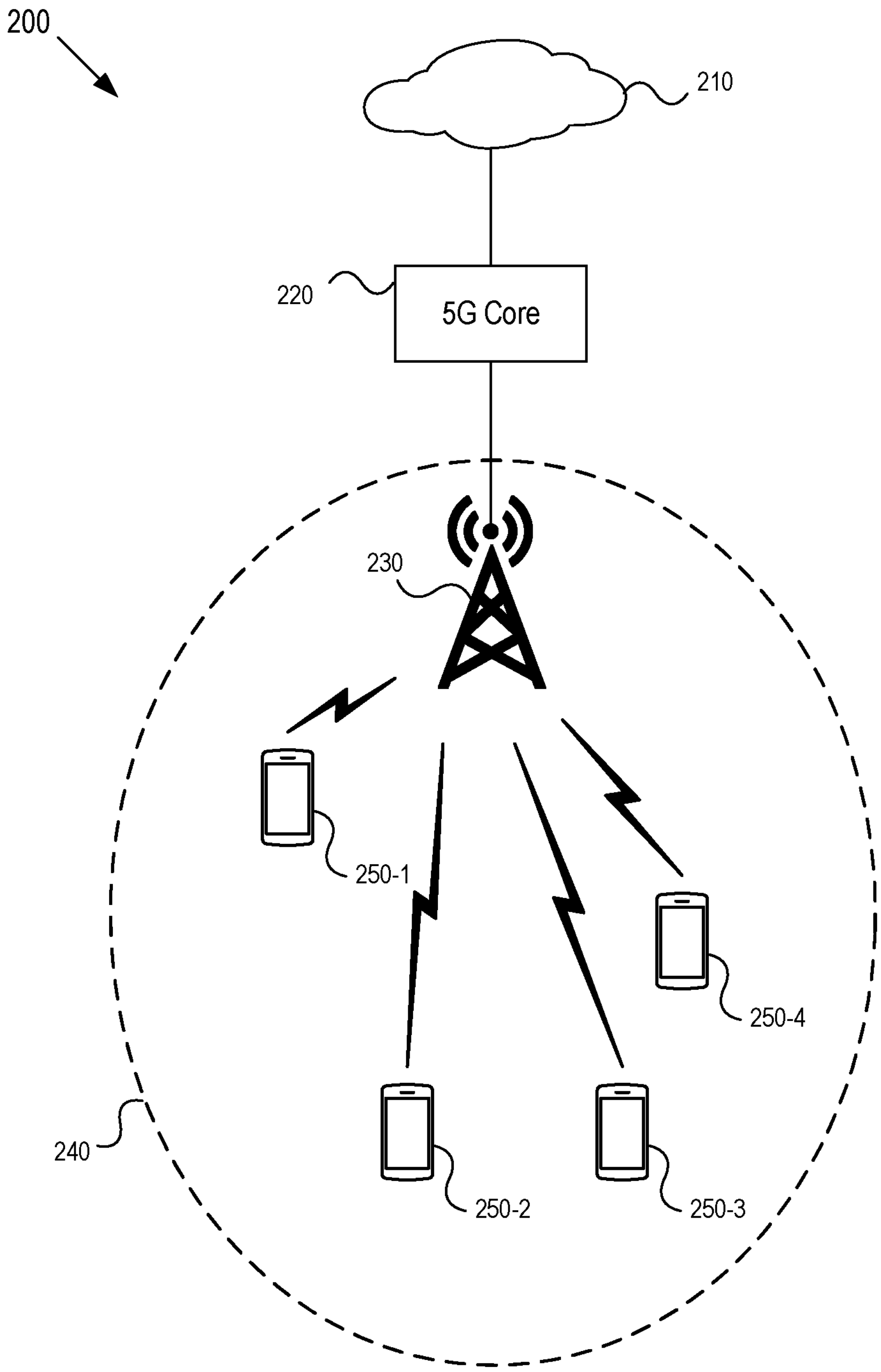
FIG. 2 illustrates an exemplary configuration of a system for wireless communication in accordance with various aspects of the present disclosure

FIG. 2 illustrates a configuration in which a system 200 provides coverage via an access node within a particular area. For purposes of illustration and explanation, the system 200 is illustrated as a 5G System (5GS); however, in practical implementations the system 200 may correspond to any RAT or combinations of RATs, including but not limited to 3G RATs such as GSM, UMTS, CDMA, etc.; 4G RATs such as WiMAX, LTE, etc.; 5G RATs such as NR; and further extensions or updated implementations of the same.

As illustrated, the system 200 comprises a communication network 210, a 5G core 220, an access node 230 which provides service in a coverage area 240, and a plurality wireless devices 250-1 to 250-4 (collectively referred to as wireless devices 250). For purposes of illustration and ease of explanation, only one access node 230 and four wireless devices 250 are shown in the system 200; however, as noted above with regard to FIG. 1, additional access nodes and/or additional or fewer wireless devices may be present in the system 200. In the illustration of FIG. 2, the access node 230 is connected to the communication network 210 via an NR path (including the 5G core 220); however, in practical implementations the access node 230 may be connected to the communication network 210 via multiple paths (e.g., using multiple RATs). The access node 230 communicates with the 5G core 220 via one or more communication links, each of which may be a direct link (e.g., an N2 link, an N3 link, or the like). The access node 230 may also communicate with additional access nodes via a direct link.

A scheduling entity may be located within the access node 230 and/or the 5G core 220, and may be configured to accept and deny connection requests and manage communication sessions, to allocate resources and RATs to improve overall network resource utilization and performance, to configure connected wireless devices, and the like. The access node 230 may be any network node configured to provide communications between the connected wireless devices and the communication network 210, including standard access nodes and/or short range, lower power, small access nodes. As examples of a standard access node, the access node 230 may be a macrocell access node, a base transceiver station, a radio base station, a gNodeB in 5G networks, an eNodeB in 4G/LTE networks, or the like, including combinations thereof. In one particular example, the access node 230 may be a macrocell access node in which a range of the coverage area 240 is from approximately five to thirty-five kilometers (km) and in which the output power is in the tens of watts (W). As examples of a small access node, the access node 230 may be a microcell access node, a picocell access node, a femtocell access node, or the like, including a home gNodeB or a home eNodeB.

The access node 230 can comprise one or more electronic processors and associated circuitry to execute or direct the execution of computer-readable instructions such as those described herein. In so doing, the access node 230 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the access node 230 can receive instructions and other input at a user interface.

Figure 3:
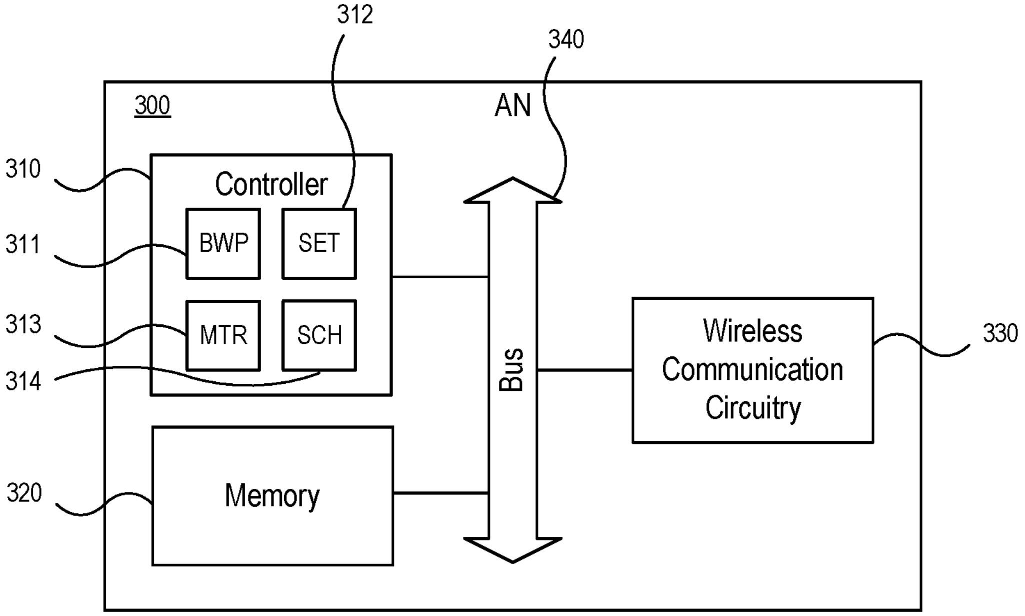
FIG. 3 illustrates an exemplary access node in accordance with various aspects of the present disclosure.

FIG. 3 illustrates one example of an access node 300, which may correspond to one or more of the access nodes 130 shown in FIG. 1 and/or the access node 230 shown in FIG. 2. The access node 300 may be configured to communicate with a plurality of wireless devices using a wideband (e.g., a carrier or combination of carriers) including at least one narrowband (e.g., including a first BWP and a second BWP). As illustrated the access node 300 includes a controller 310, a memory 320, wireless communication circuitry 330, and a bus 340 through which the various elements of the access node 300 communicate with one another. The controller 310 is one example of an electronic processor, and may include sub-modules or units, each of which may be implemented via dedicated hardware (e.g., circuitry), software modules which are loaded from the memory 320 and processed by the controller 310, firmware, and the like, or combinations thereof. These include a BWP configuration module 311, a setting module 312, a monitoring module 313, and a scheduling module 314. Some or all of the sub-modules or units may physically reside within the controller 310, or may instead reside within the memory 320 and/or may be provided as separate units within the access node 300, in any combination. The various sub-modules or units may include or implement logic circuits, thereby to perform operations such as setting parameters, monitoring parameters, comparing parameters, generating instructions, and so on.

While FIG. 3 illustrates the BWP configuration module 311, the setting module 312, the monitoring module 313, and the scheduling module 314 as being separate modules, in practical implementations some of the modules may be combined with one another and/or may share components (e.g., logic gates). Through the BWP configuration module 311, the setting module 312, the monitoring module 313, and the scheduling module 314, the access node 300 (e.g., the controller 310) may be configured to perform various operations to implement methods in accordance with the present disclosure. While one example of operations performed by the modules is described here, in practical implementations at least some of the operations described as being performed by one module may instead be performed by another module, including a module not explicitly named here.

The BWP configuration module 311 may be configured to define one or more BWPs for wireless devices connected to the access node 300. For example, the BWP configuration module 311 may configure two or more dedicated BWPs for a wireless device, each of which uses a different resource allocation type. In one particular implementation, the BWP configuration module 311 is configured to configure a first BWP and a second BWP for the wireless device, wherein the first BWP has a first resource allocation type (i.e., one of Type 0 or Type 1) and the second BWP has a second resource allocation type (i.e., the other of Type 0 or Type 1), and wherein both the first BWP and the second BWP include frequencies within the same carrier. The BWP configuration module 311 may also instruct the wireless device that either the first BWP or the second BWP is initially the active BWP (e.g., the BWP over which the wireless device is configured to communicate with the access node 300). To accomplish this, the BWP configuration module 311 may transmit a message to the wireless device which includes configuration messages (e.g., RRC or DCI messages) specifying several parameters including, for each BWP: a BWP identifier, a resource allocation type, and a starting resource identifier and resource length (e.g., a starting RB index and number of contiguous RBs for Type 1) or a bitmap (e.g., an RBG bitmap index for Type 0). In some implementations, the message may further include parameters such as a subcarrier spacing (SCS), a numerology, and the like.

The setting module 312 may be configured to set various trigger criteria and/or thresholds. For example, the setting module 312 may be configured to set or define a traffic condition for the access node 300. The traffic condition may be related to a packet size (e.g., an average packet size over a predetermined time window). The setting module 312 may additionally be configured to set or define thresholds for the access node 300 relating to the traffic condition, which may include a first packet size threshold and a second packet size threshold. The first and second packet size thresholds may be the same as or different from one another. The traffic condition may also relate to parameters other than packet size; for example, the condition may instead relate to a packet type (voice vs. data, background vs. foreground, etc.). The various trigger criteria or thresholds may additionally include time parameters; for example, a predetermined amount of time for which a respective trigger criteria or condition must exist or be met in order for the trigger criteria or condition to be deemed satisfied, or a predetermined amount of time for which a respective parameter must be greater than or less than a corresponding threshold must be surpassed in order for it to be determined that the threshold has been surpassed (in the corresponding direction). The duration of the amount of time may be defined by an operator of the access node 300, such as a network operator. In some implementations, the duration may be selected so as to approximate a measure of instantaneous traffic patterns, for example by setting the duration to equal the length of tens of data frames.

The monitoring module 313 may be configured to monitor a traffic parameter or, in some implementations, multiple traffic parameters. A traffic parameter may be related to or based on a packet size for transmissions from the access node 300 to a connected wireless device (e.g., downlink data transmissions) using a particular BWP (e.g., a first BWP of a carrier). The packet size may be determined as an average over a predetermined time window, the length of which may be set or reset by a network operator. The monitoring module 313 may also be configured with various logic circuits or elements in order to various logic operations, including but not limited to operations of comparing, monitoring, and identifying various aspects of the network and/or the access node 300. For example, the logic circuits or elements may be configured to compare the traffic parameter or parameters to one or more of the traffic thresholds and/or conditions described above and make determinations based on the comparison.

The scheduling module 314 may be configured to determine the manner in which the wireless device connected to the access node 300 perform communications with the access node 300. For example, the scheduling module 314 may be configured to schedule communications with the wireless device so that they are performed using a particular BWP (e.g., a first BWP). The scheduling module 314 may also be configured to cause BWP switching. For example, in response to a determination made by the monitoring module 313 (e.g., a determination that the traffic parameter meets the traffic condition, a determination that a traffic pattern indicates that an average size exceeds a first threshold, a determination that a traffic type meets a traffic type condition, etc.), the scheduling module 314 may be configured to instruct the wireless device to switch from communication (e.g., DL communication) with the access node 300 over the first BWP to communication with the access node 300 over the second BWP. Subsequently, in response to a further determination made by the monitoring module 313 (e.g., a determination that the traffic parameter no longer meets the traffic condition, a determination that the traffic pattern indicates that the average size is less than a second threshold, a determination that the traffic type no longer meets the traffic type condition, etc.), the scheduling module 314 may be configured to instruct the wireless device to switch from communication with the access node 300 over the second BWP back to communication with the access node 300 over the first BWP. The instructions may be sent via a DCI transmission.

Figure 5A:
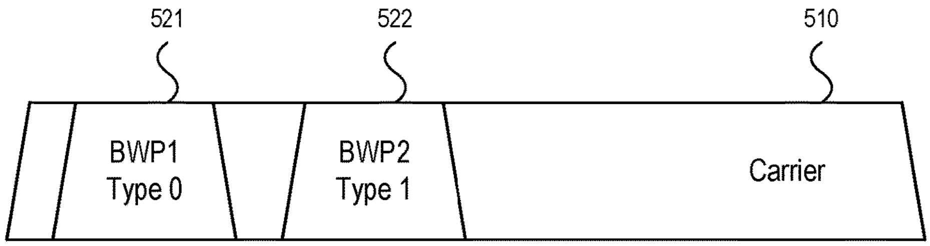
FIGS. 5A and 5B respectively illustrate exemplary in-band resource allocations in accordance with various aspects of the present disclosure.
Figure 5B:
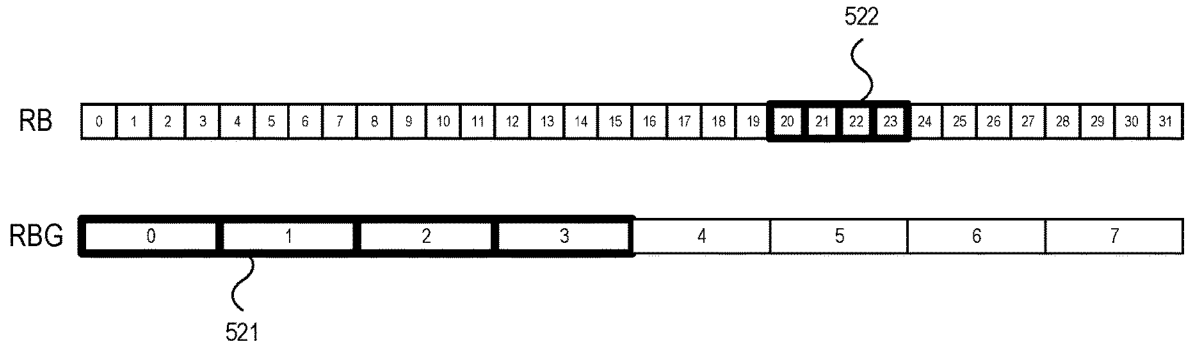

The operations performed by the BWP configuration module 311, the setting module 312, the monitoring module 313, and/or the scheduling module 314 may be performed individually for each of the wireless devices connected to the access node 300. In this manner, the resource allocation may be tailored to the particular communication conditions of the connected wireless devices in a device-by-device manner. Examples of resource allocations operations collectively performed by the BWP configuration module 311, the setting module 312, the monitoring module 313, and/or the scheduling module 314 are illustrated in FIGS. 5A and 5B. FIG. 5A illustrates the BWPs within the wideband whereas FIG. 5B illustrates the resource allocation for the BWPs illustrated in FIG. 5A.

In FIG. 5A, the access node 300 is configured for communication with one or more wireless devices in a comparatively wide carrier 510 which includes a first BWP 521 and a second BWP 522. The first BWP 521 and the second BWP 522 include frequency resources within the overall frequency range of the carrier 510. While FIGS. 5A and 5B illustrate the first and second BWPs 521 and 522 as non-overlapping, in practical implementations the first and second BWPs 521 and 522 may be at least partially overlapping (including entirely overlapping) and may occupy the entire carrier 510). The first BWP 521 has a Type 0 resource allocation (e.g., "coarse" granularity at the RBG level) and the second BWP 522 has a Type 1 resource allocation (e.g., "fine" granularity at the RB level), although in some implementations the resource allocation types may be transposed. This is shown in more detail in FIG. 5B, in which the first BWP 521 includes RBGs with indices 0 to 3, corresponding to the RBs with indices 0 to 15, and the second BWP 522 includes RBs with indices 20 to 23. While FIG. 5B shows a total of 32 RBs and 7 RBGs, in practical implementations the carrier 510 will include more RBs and/or RBGs in total. In one particular example, the carrier 510 has a bandwidth of 10 MHZ, and includes 52 RBs divided among 13 RBGs such that each potential RBG consists of 4 RBs. However, as noted above, the carrier 510 may have a bandwidth of up to 100 MHz in Frequency Range 1 and up to 400 MHz in Frequency Range 2. Moreover, while FIG. 5B shows each RBG as consisting of 4 RBs, in practical implementations an RBG may be defined as including a larger number of RBs.

Returning to FIG. 3, the wireless communication circuitry 330 may include circuit elements configured for inbound communication to receive wireless signals (e.g. one or more antennas) as well as interface elements configured, for example, to translate data signals from wireless input into control or other signals for the controller 310. Moreover, the wireless communication circuitry 330 may include circuit elements configured for outbound communication to generate wireless signals (e.g., one or more antennas) as well as interface elements configured, for example, to translate control signals from the controller 310 into data signals for wireless output. For example, the access node 300 may be configured to receive communications from the wireless device via the wireless communication circuitry 330 and output communications and/or control signals or instructions to the wireless device via the wireless communication circuitry 330, thereby managing traffic and network resources. The access node 300 may include additional wireless communication circuitry elements, for example to communicate using additional frequencies and/or to provide connectivity for different RATs. The access node 300 may further include additional wired communication circuitry elements.

Figure 4:
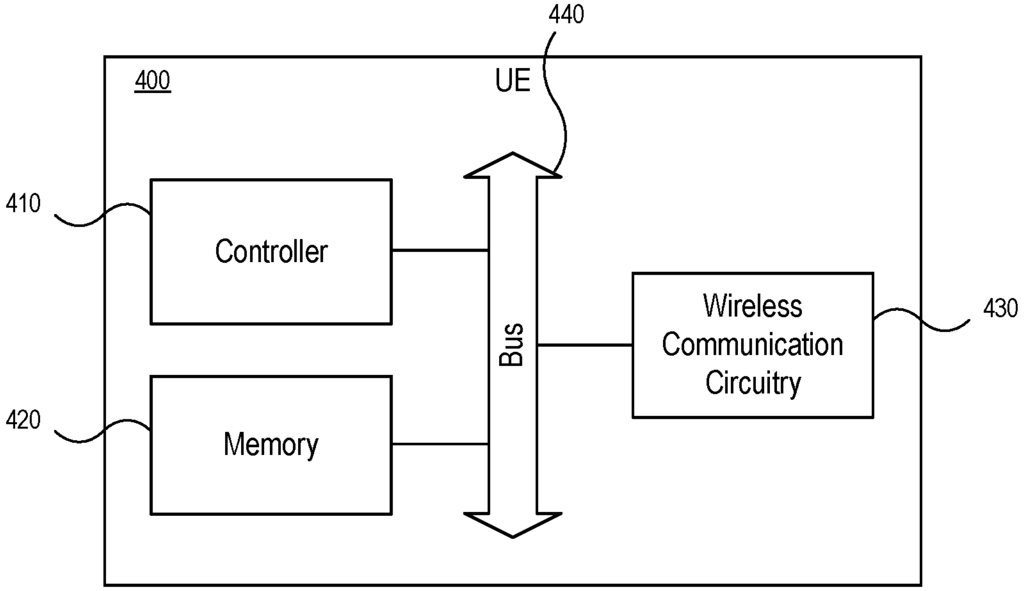
FIG. 4 illustrates an exemplary wireless device in accordance with various aspects of the present disclosure.

FIG. 4 illustrates one example of a wireless device 400 (i.e., a UE), which may correspond to one or more of the wireless devices 140 shown in FIG. 1 and/or one or more of the wireless devices 250 shown in FIG. 2. As illustrated, the wireless device 400 includes a controller 410, a memory 420, a wireless communication circuitry 430, and a bus 440 through which the various elements of the wireless device 400 communicate with one another. The controller 410 includes various sub-modules or units to implement operations and processes in accordance with the present disclosure. For example, the controller 410 may include modules that (e.g., in response to commands or instructions from an access node) may cause the wireless device 400 to switch among various carriers. Alternatively, the controller 410 may load a module from the memory 420 (e.g., a software module) to switch among various carriers.

The wireless communication circuitry 430 may include circuit elements configured for inbound communication to receive wireless signals (e.g. one or more antennas) as well as interface elements configured, for example, to translate data signals from wireless input into control or other signals for the controller 410. Moreover, the wireless communication circuitry 430 may include circuit elements configured for outbound communication to generate wireless signals (e.g., one or more antennas) as well as interface elements configured, for example, to translate control signals from the controller 410 into data signals for wireless output. For example, the wireless device 400 may be configured to transmit communications to the access node via the wireless communication circuitry 430 and receive communications and/or control signals or instructions from the access node via the wireless communication circuitry 430. The wireless device 400 may include additional wireless communication circuitry elements, for example to communicate using different RATs or different frequency resources.

Returning to FIG. 2, the communication network 210 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The communication network 210 can be capable of carrying data, for example to support voice, push-to-talk (PTT), broadcast video, and/or data communications by the wireless devices 250. Wireless network protocols can comprise Multimedia Broadcast Multicast Services (MBMS), CDMA, 1×RTT, GSM, UMTS, High Speed Packet Access (HSPA), Evolution-Data Optimised (EV-DO), EV-DO rev. A, 3GPP LTE, WiMAX, 4G including LTE Advanced and the like, and 5G including 5G NR or 5G Advanced, or combinations thereof. Wired network protocols that may be utilized by the communication network 210 comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The communication network 210 may also comprise additional base stations, controller nodes, telephony switches, internet routers, network gateways, computer systems, communication links, other types of communication equipment, and combinations thereof.

The communication links connecting the access node 230 to the 5G core 220 may respectively use various communication media, such as air, space, metal, optical fiber, other signal propagation paths, and combinations thereof. The communication links may respectively be wired or wireless and use various communication protocols such as Internet, Internet protocol (IP), LAN, optical networking, hybrid fiber coax (HFC), telephony, T1, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1×RTT, GSM, UMTS, HSPA, EV-DO, EV-DO rev. A, 3GPP LTE, WiMAX, 4G including LTE Advanced and the like, and 5G including 5G NR or 5G Advanced, or combinations thereof. The communication links may respectively be a direct link or might include various equipment, intermediate components, systems, and networks. The communication links may comprise many different signals sharing the same link.

The communication network 210, the access node 230, and/or the 5G core 220 may collectively implement several control plane network functions (NFs) and user plane NFs. The control plane NFs include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane NFs include but are not limited to a User Plane Function (UPF). Control plane NFs can provide one or more NFs based on a request-response or subscribe-notify model. In some implementations, the PCF implements the URSP manager. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 220. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the 5G core 220, thereby terminating RAN control plane and UE traffic originating on either the N1 or N2 reference interface. In the 5G core 220, the functionality of the 4G Mobility Management Entity (MME) is decomposed into the AMF and the SMF. The AMF receives all connection and session related information from the UE using N1 and N2 interfaces, and is responsible for handling connection and mobility management tasks.

A Unified Data Repository (UDR) may also be present. The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QOS) handling, etc. When compared with 4G EPC, the functions of the UPF may resemble those of the SGW-U (Serving Gateway User Plane function) and PGW-U (PDN Gateway User Plane function).

Other network elements may be present in the system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the access node 230 and the communication network 210.

Figure 6:
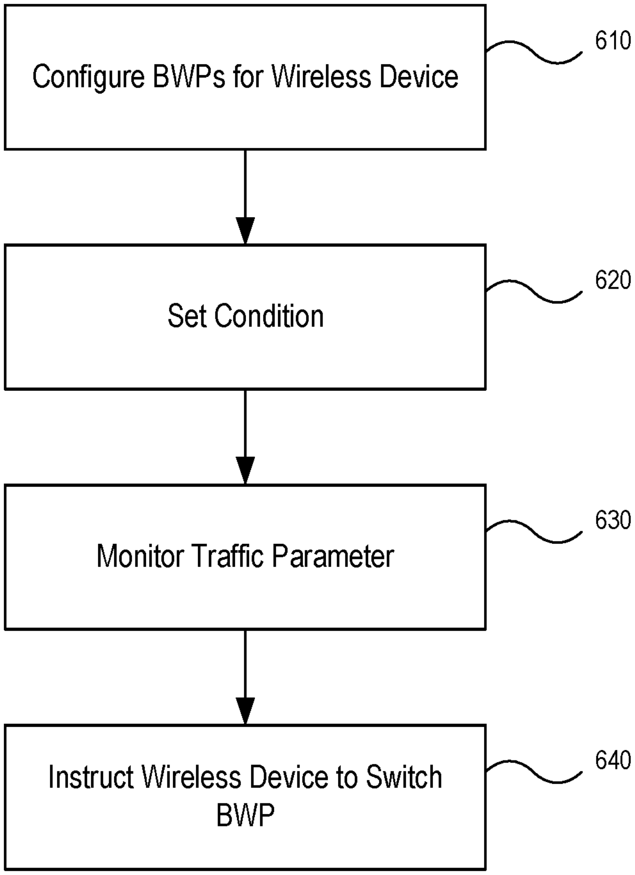
FIGS. 6 and 7 respectively illustrate exemplary process flows for managing resources in accordance with various aspects of the present disclosure.

FIG. 6 illustrates an exemplary process flow for managing resources (i.e., for dynamically switching resource allocation types using BWPs). The operations of FIG. 6 will be described as being performed by the access node 300 in communication with the wireless device 400 for purposes of explanation. In other implementations, the operations may be performed by or under the control of a processing node external to the access node 300, and may be performed with regard to communications with a device other than the wireless device 400. Generally, the process flow of FIG. 6 may be implemented using any access node that is configured to communicate with any wireless device over a wideband which includes BWP(s).

The process flow begins at operation 610 with configuring BWPs for one or more wireless devices connected to the access node 300. For example, operation 610 may comprise configuring a first BWP and a second BWP for the wireless device 400, wherein the first BWP has a first resource allocation type and the second BWP has a second resource allocation type. The first BWP may be configured as an initial or default BWP, such that the wireless device 400 is initially or by default configured to communicate with the access node 300. The first resource allocation type may have a first granularity (e.g., a relatively coarse granularity at the RBG level) and the second resource allocation type may have a second granularity (e.g., a relatively fine granularity at the RB level). In some implementations, operation 610 may be performed by transmitting a configuration message to the wireless device 400, the configuration message defining the first BWP and the second BWP with their respective resource allocation types.

At operation 620, the process flow sets one or more traffic conditions and/or thresholds. The traffic condition may be related to a packet size (e.g., an average packet size over a predetermined time window). One or more thresholds may be set or defined which relate to the traffic condition, which may include one or more packet size thresholds that may be the same as or different from one another. The traffic condition may also relate to parameters other than packet size; for example, the condition may instead relate to a packet type (voice vs. data, background vs. foreground, etc.). The various traffic conditions or thresholds may additionally include time parameters; for example, a predetermined amount of time for which a respective trigger criteria or condition must exist or be met in order for the traffic condition to be deemed satisfied, or a predetermined amount of time for which a respective parameter must be greater than or less than a corresponding threshold must be surpassed in order for it to be determined that the threshold has been surpassed (in the corresponding direction). The duration of the amount of time may be defined by an operator of the access node 300, such as a network operator. In some implementations, the duration may be selected so as to approximate a measure of instantaneous traffic patterns, for example by setting the duration to equal the length of tens of data frames.

Operation 630 includes monitoring a traffic parameter or parameters. A traffic parameter may be related to or based on a packet size for transmissions from the access node 300 to the connected wireless device 400 (e.g., DL data transmissions) using a particular BWP (e.g., a first BWP of a carrier). The packet size may be determined as an average over a predetermined time window, the length of which may be set or reset by a network operator. Operation 630 may also include various logic operations, including but not limited to operations of comparing, monitoring, and identifying various aspects of communications between the access node 300 and the wireless device 400. For example, operation 630 may include comparing the traffic parameter or parameters to one or more of the traffic thresholds and/or conditions described above and making determinations based on the comparison.

In response to a determination that the traffic parameter meets the traffic condition (i.e., exceeds one or more thresholds, meets one or more criteria, etc.), either at a given time or for at least a first predetermined amount of time, at operation 640 the access node 300 instructs the wireless device 400 to switch BWPs; for example, from communication with the access node 300 over the first BWP to communication with the access node 300 over the second BWP. Operation 640 may include sending a DCI transmission to the wireless device 400 which causes the wireless device 400 to switch BWPs.

Figure 7:
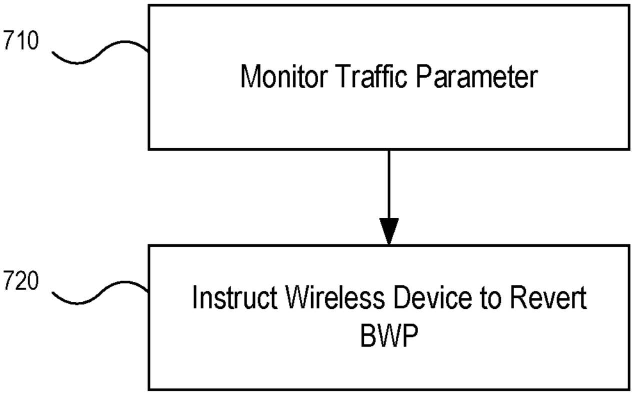

In some implementations, after the performance of operation 640, the access node 300 may be configured to begin performing new or different operations. One example of a subsequent process flow for managing resources is illustrated in FIG. 7, which (as above) will be described as being performed by the access node 300 in communication with the wireless device 400 for purposes of explanation. In other implementations, the operations may be performed by or under the control of a processing node external to the access node 300, and may be performed with regard to communications with a device other than the wireless device 400. Generally, the process flow of FIG. 7 may be implemented using any access node that is configured to communicate with any wireless device over a wideband which includes BWP(s).

The process flow beings at operation 710 with monitoring a traffic parameter or parameters. A traffic parameter may be related to or based on a packet size for transmissions from the access node 300 to the connected wireless device 400 (e.g., DL data transmissions) using a particular BWP (e.g., a first BWP of a carrier). The packet size may be determined as an average over a predetermined time window, the length of which may be set or reset by a network operator. In some examples, operation 710 may be the same as or similar to operation 630 of FIG. 6. Operation 710 may also include various logic operations, including but not limited to operations of comparing, monitoring, and identifying various aspects of communications between the access node 300 and the wireless device 400. For example, operation 710 may include comparing the traffic parameter or parameters to one or more of the traffic thresholds and/or conditions described above and making determinations based on the comparison. The thresholds and/or conditions may be the same as or different from those used in operation 630. In one particular example, operation 710 may be performed with respect to a traffic condition that is the converse of a traffic condition used for operation 630 (e.g., whether a traffic parameter meets a traffic condition vs. whether the traffic parameter no longer meets the traffic condition, etc.).

In response to a determination that the traffic parameter no longer meets the traffic condition (i.e., no longer exceeds or is smaller than one or more thresholds, no longer meets one or more criteria, etc.), either at a given time or for at least a first predetermined amount of time, at operation 720 the access node 300 instructs the wireless device 400 to revert BWPs; for example, from communication with the access node 300 over the second BWP back to communication with the access node 300 over the first BWP. Operation 720 may include sending a DCI transmission to the wireless device 400 which causes the wireless device 400 to switch BWPs.

The operations of FIG. 6 and/or FIG. 7 need not necessarily be performed one after another in immediate sequence. For example, operations 610 and 620 may be performed in advance, for example during a network configuration operation and/or during startup of the access node 300. Subsequently, operation 630 may be performed continuously or continually until operation 630 determines that the traffic parameter meets the traffic condition, at which point operation 640 may occur. Subsequently, operation 710 may be performed continuously or continually until operation determines that the traffic parameter no longer meets the traffic condition or now meets a new traffic condition, at which point operation 720 may occur. Thereafter, operations 630 and 640 may again be performed as appropriate, switching between portions of the process flow of FIG. 6 and the process flow of FIG. 7 as appropriate.

While the above descriptions illustrate various aspects of the present disclosure in which only a single BWP adjustment is performed (and in some cases reverted), the present disclosure is not so limited. The methods, operations, etc. described above may be performed in parallel with other forms of resource management, whether or not the other forms are based on the use of BWPs. For example, the systems, methods, and devices herein may operate with regard to a first pair of BWPs having different allocation types and one particular numerology, and also with regard to a second pair of BWPs having the different allocation types and another numerology. In this example, the access node 300 may configure the wireless device 400 with four BWPs: a first BWP having numerology 0 and a Type 0 allocation, a second BWP having numerology 0 and a Type 1 allocation, a third BWP having numerology 1 and a Type 0 allocation, and a fourth BWP having numerology 1 and a Type 1 allocation. The operations described herein may be performed with regard to resource allocation type (e.g., switching between the first and second BWPs and with regard to switching between the third and fourth BWPs,) and may be performed together with other operations that are performed with regard to numerology (e.g., switching between the first and third BWPs and between the second and fourth BWPs).

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as “a,” “the,” “said,” etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of resource allocation using bandwidth parts, comprising:

configuring a first bandwidth part (BWP) comprising a first group of contiguous resource blocks (RBs) and a second BWP comprising a second group of contiguous RBs for a wireless device, wherein the wireless device is configured to communicate with an access node over the first BWP, wherein the first BWP has a first resource allocation type and the second BWP has a second resource allocation type;

setting a traffic condition comprising a plurality of parameters, the plurality of parameters comprising a packet type parameter and an additional parameter that includes a configurable corresponding time parameter that is a respective predetermined amount of time that the additional parameter must satisfy a respective trigger criteria for the traffic condition to be deemed met;

monitoring traffic parameters for communications between the wireless device and the access node; and in response to a determination that the traffic parameters meet the traffic condition by satisfying a packet type of the packet type parameter and the configurable corresponding time parameter of the additional parameter, instructing the wireless device to switch from communication with the access node over the first BWP to communication with the access node over the second BWP.

2. The method according to claim 1, wherein the second resource allocation type has a finer granularity than the first resource allocation type, the granularity corresponding to a smallest allocatable set of resource blocks.

3. The method according to claim 1, wherein a traffic parameter of the traffic parameters is based on a packet size for transmissions from the access node to the wireless device.

4. The method according to claim 3, wherein the packet size is determined as an average over a predetermined time window.

5. The method according to claim 3, wherein the traffic condition is determined to be met when the packet size exceeds a size threshold for a predetermined amount of time.

6. The method according to claim 1, further comprising:

after instructing the wireless device to switch from communication with the access node over the first BWP to communication with the access node over the second BWP, and in response to a determination that the traffic parameter no longer meets the condition, instructing the wireless device to switch from communication with the access node over the second BWP to communication with the access node over the first BWP.

7. A system for resource allocation using bandwidth parts, comprising:

an access node configured to communicate with a wireless device over a carrier, the access node including at least one electronic processor configured to perform operations including:

transmitting a configuration message to the wireless device, the configuration message defining a first bandwidth part (BWP) having a first resource allocation type and a second BWP having a second resource allocation type different from the first resource allocation type, wherein the first BWP comprises a first group of contiguous resource blocks (RBs) and the second BWP comprises a second group of contiguous RBs;

setting a traffic condition comprising a plurality of parameters, the plurality of parameters comprising a packet type parameter and an additional parameter that includes a configurable corresponding time parameter that is a respective predetermined amount of time that the additional parameter must satisfy a respective trigger criteria for the traffic condition to be deemed met;

monitoring traffic parameters for data communications from the access node to the wireless device; and in response to a determination that the traffic parameters meet the traffic condition by satisfying a packet type of the packet type parameter and the configurable corresponding time parameter of the additional parameter, transmitting a first instruction to the wireless device, the instruction causing the wireless device to switch from using the first BWP to using the second BWP.

8. The system according to claim 7, further comprising allocating resources in units of individual resource blocks for data communications using the first BWP.

9. The system according to claim 7, further comprising allocating resources in units of groups of resource blocks for data communications using the second BWP.

10. The system according to claim 7, wherein transmitting the first instruction to the wireless device includes sending a Downlink Control Information (DCI) transmission.

11. The system according to claim 7, wherein monitoring the traffic parameter includes determining an average packet size for the data communications within a predetermined window of time.

12. The system according to claim 11, wherein the traffic condition is determined to be met when the average packet size exceeds a predetermined threshold for a predetermined amount of time.

13. The system according to claim 7, wherein the traffic condition is configurable by a network operator.

14. The system according to claim 7, further comprising:

in response to a determination that the traffic parameter no longer meets the traffic condition, transmitting a second instruction to the wireless device, the second instruction causing the wireless device to revert from using the second BWP to using the first BWP.

15. The system according to claim 7, wherein both the first BWP and the second BWP include frequencies within the carrier.

16. A non-transitory computer-readable medium storing instructions that, when executed by an electronic processor of a processing node, cause the processing node to perform operations comprising:

defining a first dedicated bandwidth part (BWP) comprising a first group of contiguous resource blocks (RBs) and a second BWP comprising a second group of contiguous RBs for communications from an access node to a wireless device, wherein the first BWP is associated with a first resource allocation type and the second BWP is associated with a second resource allocation type different from the first resource allocation type;

configuring the wireless device with the first BWP and the second BWP;

setting a traffic condition comprising a first threshold, the first threshold comprising a plurality of parameters, the plurality of parameters comprising a packet type parameter and an additional parameter that includes a configurable corresponding time parameter that is a respective predetermined amount of time that the additional parameter must satisfy a respective trigger criteria for the traffic condition to be deemed met;

monitoring traffic parameters for the communications between the access node and the wireless device using the first BWP; and in response to a determination that the traffic parameters meet the first threshold by satisfying a packet type of the packet type parameter and the configurable corresponding time parameter of the additional parameter, instructing the wireless device to switch to receiving the communications from the access node using the second BWP.

17. The non-transitory computer-readable medium according to claim 16, wherein the operations further comprise:

monitoring the traffic parameters for the communications from the access node to the wireless device using the second BWP; and in response to a determination that the traffic parameters does not meet a second threshold, instructing the wireless device to switch to receiving the communications from the access node using the first BWP.

18. The non-transitory computer-readable medium according to claim 17, wherein the second threshold is the same as the first threshold.

19. The non-transitory computer-readable medium according to claim 16, wherein the first resource allocation type is a 3rd Generation Partnership Project (3GPP) Type 0 allocation and the second resource allocation type is a 3GPP Type 1 allocation.

20. The non-transitory computer-readable medium according to claim 16, wherein the first threshold is configurable by a network operator.

* * * * *